UNITED STATES PATENT OFFICE.

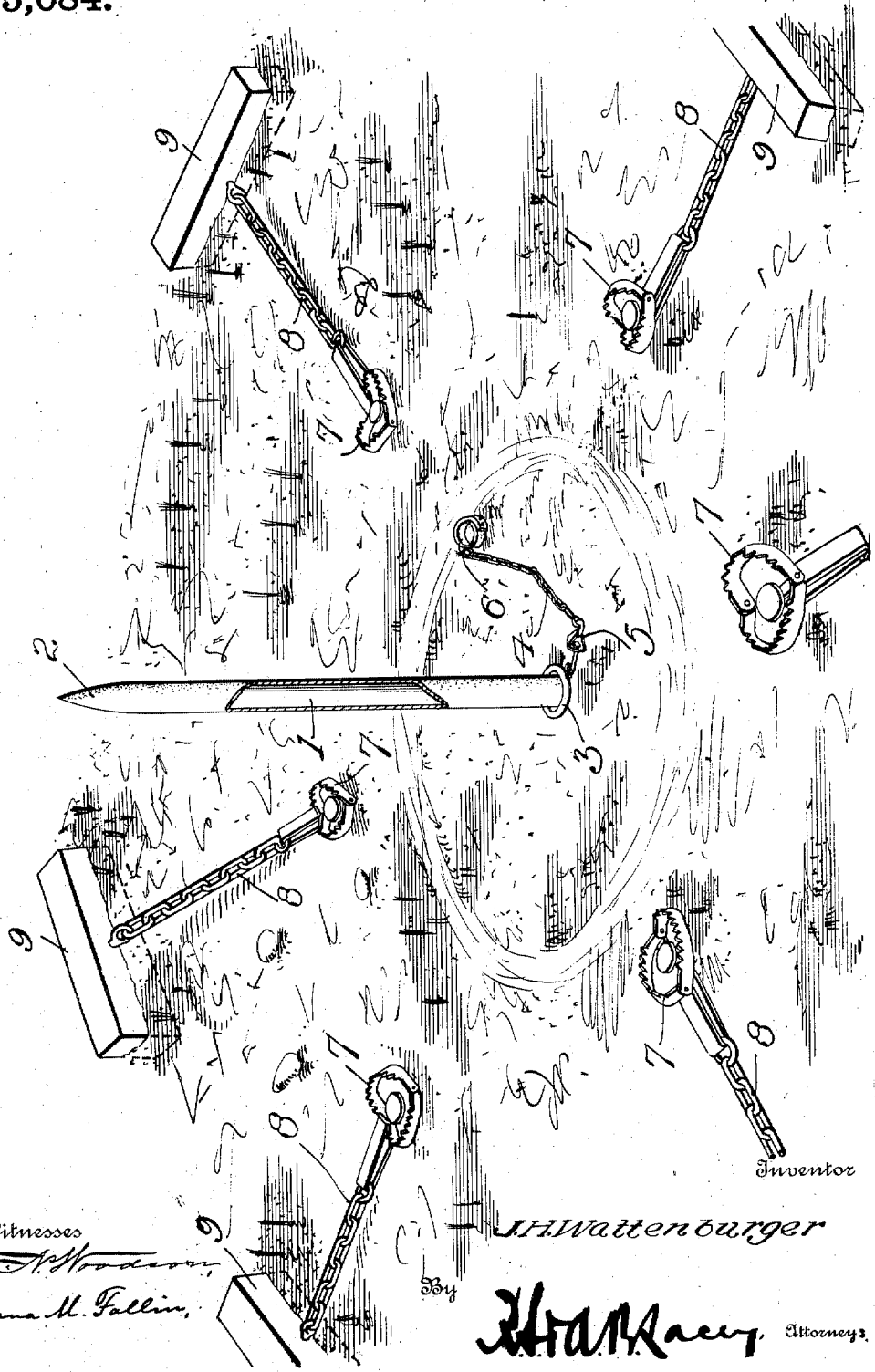

JACOB H. WATTENBURGER, OF ECHO, OREGON, ASSIGNOR OF ONE-HALF TO HIRAM B. GILLETTE, OF ECHO, OREGON.

DECOY-TETHER.

985,084. Specification of Letters Patent. Patented Feb. 21, 1911.

Application filed January 4, 1910. Serial No. 536,378.

*To all whom it may concern:*

Be it known that I, JACOB H. WATTENBURGER, citizen of the United States, residing at Echo, in the county of Umatilla and State of Oregon, have invented certain new and useful Improvements in Decoy-Tethers, of which the following is a specification.

This invention relates to hunting or trapping, and has for its primary object an improved construction and arrangement of decoy tether for animal traps, for use in capturing coyotes, cougars, panthers, lynxes and the like.

The invention consists essentially in a decoy using live bait, and comprising a post adapted to be driven into the ground, a ring or loop slipped over the post and loosely mounted thereon, a belt or similar device adapted to be secured to the decoy and connected to the ring by a chain, rope, or similar flexible connection, the decoy being set preferably within a circle of traps of any desired character so that when the animals to be caught are attracted to the live bait, the decoy can climb the pole and be instantly out of danger, while the repeated efforts of the other animals to capture the decoy will result in their being caught themselves in the traps which are arranged in proximity to the pole.

The invention also consists in a device of this character embodying a pole which is provided at its upper end with a relatively sharp point, the purpose of the same being to provide an uncomfortable perch for the decoy so that after the entrapped animal has dragged the trap into the bushes for instance, to hide, the decoy will see no danger, and owing to its uncomfortable position at the top of the post or pole, will descend, thereby automatically rebaiting the remaining traps. And the invention also consists in certain constructions, arrangements and combinations of the parts that I shall hereinafter fully describe and claim.

For a full understanding of the invention, reference is to be had to the following description and accompanying drawings in which: The figure is a perspective view showing the practical application of my device, a portion of the sheathing of the post being broken away.

In carrying out my invention, a rigid post 1, preferably of relatively soft wood, is embedded in the ground so that it will project upwardly to the required extent. If desired, so much of the post as projects above the ground, may be covered with canvas or the like as indicated at 2, to assist the decoy in climbing. A light ring of iron or any other desired material or substance is slipped loosely over the post 1 and a chain 4, or a cord or similar flexible connection is connected to the ring as by a swivel 5. To the other end of the flexible connecting member 4 is a belt 6 of leather or the like secured in any desired way, said belt being adapted to encircle and be secured to the decoy.

Preferably the traps which may be of any desired construction, and which are designated 7 are arranged in a circular series with the post 1 at the center, and at any predetermined distance from the post. The traps 7 are connected by a chain 8 or the like to clogs or drags 9 which may be embedded in the earth if desired, substantially level with the surface thereof.

In the practical use of my improved decoy for safely employing live bait, the animal to serve as a decoy is strapped in the belt 6, the traps 7 are set and preferably a trail is made to the live bait by the use of a piece of raw meat tracked along the ground. As the animals to be trapped follow the trail and are attracted to the decoy tethered to the post 1, such animal will escape by climbing the post and be at once out of danger, while the animals attracted will have a tendency to abandon their usual caution in view of the fact that they are charging live bait and before they are aware of their danger they will be caught by the traps 7. As the animal thus caught will at once drag the trap away for a short distance, so as to hide in the bushes for instance, the decoy will no longer see that it is in danger and descend the post, this movement being insured owing to the fact as will be noted from the drawing, that the upper end of the post is pointed and thereby forms a very uncomfortable and uncertain perch.

Having thus described the invention, what is claimed as new is:

A device for holding a live decoy, comprising a rigid post, a textile fabric sheathing incasing said post, and means for tethering an animal to said post.

In testimony whereof I affix my signature in presence of two witnesses.

JACOB H. WATTENBURGER. [L. S.]

Witnesses:
R. B. STANFIELD,
NONA HOUSER.